United States Patent
Zhang et al.

(10) Patent No.: US 9,935,476 B2
(45) Date of Patent: Apr. 3, 2018

(54) CHARGING MODE SWITCHING CIRCUIT AND METHOD

(71) Applicant: GUANGDONG OPPO MOBILE TELECOMMUNICATIONS CORP., LTD., Dongguan (CN)

(72) Inventors: Jialiang Zhang, Dongguan (CN); Kewei Wu, Dongguan (CN); Huihuang Zhou, Dongguan (CN); Biao Chen, Dongguan (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 35 days.

(21) Appl. No.: 15/115,070

(22) PCT Filed: May 8, 2014

(86) PCT No.: PCT/CN2014/077032
§ 371 (c)(1),
(2) Date: Jul. 28, 2016

(87) PCT Pub. No.: WO2015/113336
PCT Pub. Date: Aug. 6, 2015

(65) Prior Publication Data
US 2016/0352130 A1 Dec. 1, 2016

(30) Foreign Application Priority Data
Jan. 28, 2014 (CN) .......................... 2014 1 0042698

(51) Int. Cl.
*H02J 7/00* (2006.01)
*H02J 7/02* (2016.01)

(52) U.S. Cl.
CPC .......... *H02J 7/0068* (2013.01); *H02J 7/0072* (2013.01); *H02J 7/022* (2013.01)

(58) Field of Classification Search
USPC ....................................................... 320/107
See application file for complete search history.

(56) References Cited

U.S. PATENT DOCUMENTS 5,744,937 A * 4/1998 Cheon .................. H02J 7/0006
320/106
7,474,079 B2 * 1/2009 Hashimoto ............. H02J 7/022
320/138

(Continued)

FOREIGN PATENT DOCUMENTS

CN 1476142 A 2/2004
CN 101459347 A 6/2009

(Continued)

OTHER PUBLICATIONS

Chinese Patent Application No. 201410042698.3 First Office Action with English translation, dated May 23, 2016, 10 pages.

(Continued)

*Primary Examiner* — Samuel Berhanu
(74) *Attorney, Agent, or Firm* — Lathrop Gage LLP

(57) ABSTRACT

A circuit and method for switching a charging mode are provided. The circuit for switching a charging mode, is coupled to a cell and externally coupled to a quick-charging adapter, and includes: a switch circuit, configured to connect the charging terminal and the cell terminal if a connection instruction is received from the first controlled terminal, such that the quick-charging adapter charges the cell via the switch circuit; a switching assembly, configured to receive a switching instruction from the controlled terminal; a first controller, configured to: receive a charging instruction, receive a quick-charging instruction at the first data terminal via the data interface terminal, and send the connection instruction from the third controlling terminal if the charging instruction and the quick-charging instruction are received; and a second controller, configured to send the charging (Continued)

instruction to the first controller if an insertion of the quick-charging adapter is detected.

19 Claims, 3 Drawing Sheets

(56) References Cited

U.S. PATENT DOCUMENTS

| 8,085,001 | B2* | 12/2011 | Wang | H02J 7/0072 |
|---|---|---|---|---|
| | | | | 320/139 |
| 2006/0232133 | A1 | 10/2006 | Cha | |
| 2011/0266873 | A1 | 11/2011 | Tsuji | |
| 2012/0229074 | A1 | 9/2012 | Seethaler et al. | |
| 2013/0049704 | A1 | 2/2013 | Andou et al. | |

FOREIGN PATENT DOCUMENTS

| CN | 201690242 U | 12/2010 |
|---|---|---|
| CN | 102457094 A | 5/2012 |
| CN | 103035966 A | 4/2013 |
| TW | 201338344 A | 9/2013 |

OTHER PUBLICATIONS

Chinese Patent Application No. 201410042698.3 Second Office Action with English translation, dated Oct. 24, 2016, 13 pages.
Chinese Patent Application No. 201410042698.3 Notification to Grant Patent with English translation, dated Feb. 6, 2017, 3 pages.
Chinese Patent Application No. 201410042698.3 First Search dated May 15, 2016, 1 page.
Translation of the International Search Report and Written Opinion corresponding to International Patent Application No. PCT/CN2014/077032, dated Nov. 18, 2014, 8 pages.
European Patent Application No. 14880688.8 extended search report and opinion dated Oct. 11, 2017, 8 pages.

* cited by examiner

CHARGING MODE SWITCHING CIRCUIT AND METHOD

CROSS-REFERENCE TO RELATED APPLICATIONS

This application is a US national phase application based up an International Application No. PCT/CN2014/077032, filed on May 8, 2014, which is based on and claims priority to Chinese Patent Application No. 201410042698.3, filed on Jan. 28, 2014, the entire contents of which are incorporated herein by reference.

TECHNICAL FIELD

The present disclosure relates to the mobile terminal field, and more particularly, to a circuit and a method for switching a charging mode.

BACKGROUND

With the progress of the times, the Internet and mobile communication networks provide a large number of functions and applications. A user not only can use the mobile terminal to perform a conventional application, such as use a smart phone to answer the phone or make a call, but also can use the mobile terminal to browse webpages, transmit pictures and play games, etc.

When the mobile terminal is used to deal with things, a huge quantity of electricity in a cell of the mobile terminal is consumed because of an increased usage frequency thereof, such that it is required to charge the mobile terminal frequently; with the accelerated pace of life, especially more and more urgent emergencies, the user wants to charge the cell with the large-current.

With the increasing usage frequency of the mobile terminal, it is required to charge the mobile terminal frequently. The conventional MICRO USB interface (which includes one power line and one ground line only) is used to charge the conventional mobile terminal. Meanwhile, the mobile terminal only has one charging circuit. The charging circuit and the MICRO USB interface only support a charging current less than 3 amperes, so that a charging speed is slow and time is wasted if a cell of the mobile terminal is charged only via the conventional charging circuit.

SUMMARY

An objective of the present disclosure is to provide a circuit and a method for switching a charging mode, so as to add a switch circuit in a mobile terminal, and further to charge a cell of the mobile terminal via the switch circuit.

In one aspect, a circuit for switching a charging mode provided in the present disclosure is coupled to a cell, and further externally coupled to a quick-charging adapter. The circuit for switching a charging mode includes:

a switch circuit, having a cell terminal, a charging terminal and a first controlled terminal, in which the cell terminal is coupled to the cell, and the switch circuit is configured to connect the charging terminal and the cell terminal if a connection instruction is received from the first controlled terminal, such that the quick-charging adapter charges the cell via the switch circuit;

a switching assembly, having a data interface terminal, a first switching terminal, a second switching terminal and a controlled terminal, and configured to receive a switching instruction from the controlled terminal, in which an electric connection between the data interface terminal and the first switching terminal is established if the switching instruction specifies the first switching terminal, and an electric connection between the data interface terminal and the second switching terminal is established if the switching instruction specifies the second switching terminal;

a first controller, having a first data transmission terminal, a first data terminal, a first controlling terminal and a third controlling terminal, in which the first data terminal is coupled to the first switching terminal of the switching assembly, the first controlling terminal is coupled to the controlled terminal of the switching assembly, the third controlling terminal is coupled to the first controlled terminal of the switch circuit, and the first controller is configured to receive a charging instruction and further configured to receive a quick-charging instruction at the first data terminal via the data interface terminal of the switching assembly, and further configured to send the connection instruction from the third controlling terminal if the charging instruction is received and the quick-charging instruction is received; and a second controller, having a second data transmission terminal, a second data terminal and a second controlling terminal, in which the second data terminal is coupled to the second switching terminal of the switching assembly, the second controlling terminal is coupled to the controlled terminal of the switching assembly, the second data transmission terminal is coupled to the first data transmission terminal of the first controller, and the second controller is configured to send the charging instruction to the first controller if an insertion of the quick-charging adapter is detected at the second data terminal via the data interface terminal of the switching assembly.

In another aspect, a method for switching a charging mode is provided in the present disclosure. The method for switching a charging mode includes:

sending, by a second controller, a charging instruction to a first controller if the second controller detects an insertion of a quick-charging adapter;

sending, by the first controller, a connection instruction to a switch circuit if the first controller receives a quick-charging instruction sent by the quick-charging adapter after receiving the charging instruction; and connecting, by the switch circuit, a charging terminal and a cell terminal of the switch circuit if the switch circuit receives the connection instruction, such that the quick-charging adapter charges a cell of a mobile terminal via the switch circuit.

The present disclosure has the following benefits. The second controller sends the charging instruction to the first controller if detecting the insertion of the quick-charging adapter; and then, the switching assembly receives the switching instruction specifying the first switching terminal from the controlled terminal and establishes the electric connection between the data interface terminal and the first switching terminal; then, the first controller sends the connection instruction to the switch circuit if it receives the quick-charging instruction sent by the quick-charging adapter after receiving the charging instruction; and then, the switch circuit connects the charging terminal and the cell terminal thereof if it receives the connection instruction; therefore, the quick-charging adapter charges the cell of the mobile terminal via the conducted switch circuit, and/or charges the cell via a conventional charging circuit of the mobile terminal.

BRIEF DESCRIPTION OF THE DRAWINGS

In order to make the technical solutions of embodiments of the present disclosure more clearly, the accompanying drawings used in the description of embodiments of the present disclosure are briefly described hereunder. Obviously, the described drawings are merely some embodiments of present disclosure. For persons skilled in the art, other drawings may be obtained based on these drawings without any creative work.

DETAILED DESCRIPTION

To make the objectives, the technical solutions, and the advantages of embodiments of the present disclosure clearer, the technical solutions in embodiments of the present disclosure are hereinafter described clearly and completely with reference to the accompanying drawings in embodiments of the present disclosure. It should be understood that, specific embodiments described herein are merely used to explain the present disclosure, but not used to limit the present disclosure. In order to illustrate the technical solutions of the present disclosure, specific embodiments are described in the following.

It should be noted that, the charging adapter in embodiments of the present disclosure includes a terminal such as a power adapter, a charger, an IPAD and a smart phone, which may output a power signal for charging a cell (a cell of a mobile terminal).

It should be noted that, "first" in "first controller", "first power wire" and "first ground wire" is used for purposes of description, and "second" in "second controller", "second power wire" and "second ground wire" is also used for purposes of description.

In an embodiment of the present disclosure, the conventional mobile terminal has a charging circuit. Based on this, the present disclosure also provides a switch circuit through which a cell of the mobile terminal may be charged. Further, the conventional charging circuit is used directly to perform a regular charging on the cell of the mobile terminal if a second controller of the mobile terminal detects an insertion of a conventional charging adapter. In addition, the cell of the mobile terminal may be charged only via the switch circuit if the second controller of the mobile terminal detects the insertion of a quick-charging adapter. In at least one embodiment, the cell of the mobile terminal may be charged via the switch circuit, and meanwhile it also may be charged via the conventional charging circuit.

Figure 1:
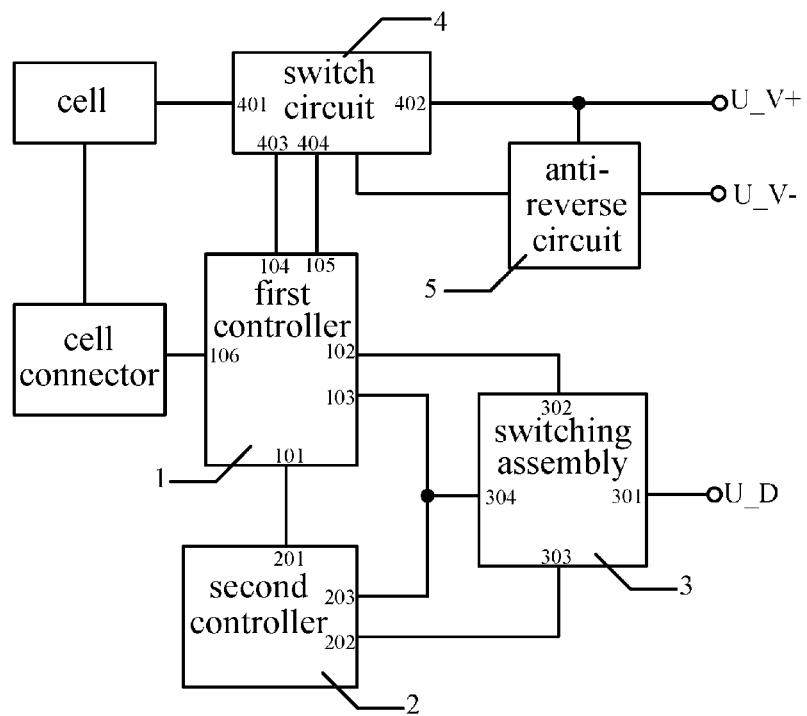
FIG. 1 is a circuit diagram showing a circuit for switching a charging mode according to an embodiment of the present disclosure.

FIG. 1 illustrates a circuit diagram showing a circuit for switching a charging mode according to an embodiment of the present disclosure. For illustration purposes, only the parts related to embodiments of the present disclosure are shown, which will be described in detail as follows.

The circuit for switching a charging mode provided by embodiments of the present disclosure is coupled to a cell, and further externally coupled to a quick-charging adapter. The circuit for switching a charging mode includes a switch circuit 4, a switching assembly 3, a first controller 1 and a second controller 2.

The switch circuit 4 has a cell terminal 401, a charging terminal 402 and a first controlled terminal 403. The cell terminal 401 is coupled to the cell. The switch circuit 4 is configured to connect the charging terminal 402 and the cell terminal 401 if a connection instruction is received from the first controlled terminal 403, such that the quick-charging adapter charges the cell via the switch circuit 4.

The switching assembly 3 has a data interface terminal 301, a first switching terminal 302, a second switching terminal 303 and a controlled terminal 304, and is configured to receive a switching instruction via the controlled terminal 304. An electric connection between the data interface terminal 301 and the first switching terminal 302 is established if the switching instruction specifies the first switching terminal 302, and an electric connection between the data interface terminal 301 and the second switching terminal 303 is established if the switching instruction specifies the second switching terminal 303.

The first controller 1 has a first data transmission terminal 101, a first data terminal 102, a first controlling terminal 103 and a third controlling terminal 104. The first data terminal 102 is coupled to the first switching terminal 302 of the switching assembly 3, the first controlling terminal 103 is coupled to the controlled terminal 304 of the switching assembly 3, and the third controlling terminal 104 is coupled to the first controlled terminal 403 of the switch circuit 4. The first controller 1 is configured to receive a charging instruction and further configured to receive a quick-charging instruction at the first data terminal 102 via the data interface terminal 301 of the switching assembly 3, and further configured to send the connection instruction from the third controlling terminal 104 if the charging instruction is received and the quick-charging instruction is received.

The second controller 2 has a second data transmission terminal 201, a second data terminal 202 and a second controlling terminal 203. The second data terminal 202 is coupled to the second switching terminal 303 of the switching assembly 3, the second controlling terminal 203 is coupled to the controlled terminal 304 of the switching assembly 3 and the second data transmission terminal 201 is coupled to the first data transmission terminal 101 of the first controller 1. The second controller 2 is configured to send the charging instruction to the first controller 1 if an insertion of the quick-charging adapter is detected at the second data terminal 202 via the data interface terminal 301 of the switching assembly 3.

It should be noted that, the charging terminal 402 of the switch circuit 4 is coupled to a node U_V+ and the data interface terminal 301 of the switching assembly 3 is coupled to a node U_D. The charging terminal 402 of the switch circuit 4 is coupled to a power wire of a charging interface of the mobile terminal and the data interface terminal 301 of the switching assembly 3 is coupled to a data wire (for example, a differential data wire; for another example, a data wire using OTG (On-The-Go) technology) of the charging interface of the mobile terminal.

It should be noted that, the second controller 2 is a controller configured to execute application programs. The second controller 2 is configured to answer a phone call, to play an online audio and video, to perform an online Wechat, etc.

In addition, it should be noted that, the first controller 1 is added in the conventional mobile terminal and configured to communicate with the quick-charging adapter and the second controller 2, thereby matching and receiving the quick-charging instruction when the quick-charging adapter sends this quick-charging instruction. In at least one embodiment, the first controller 1 may also perform a data transmission with the quick-charging adapter, including: sending parameters (temperature, electric quantity, etc.) of the cell of the mobile terminal to the quick-charging adapter.

In addition, it should be noted that, as long as the cell of the mobile terminal is not charged, the data interface terminal 301 of the switching assembly 3 is coupled to the second switching terminal 303 of the switching assembly 3. Moreover, the second controller 2 may detect the insertion of the charging adapter immediately by using USB2.0 protocol after the charging interface of the mobile terminal is insertion-connected with the charging interface of the charging adapter. In at least one embodiment, the second controller 2 may also detect whether it is the charging adapter that is inserted, for example, if a USB interface of another terminal is insertion-connected with the charging interface of the mobile terminal, the second controller 2 may recognize that a data communication (not charging) is required to be performed with the other terminal via the USB interface by using USB2.0 protocol. In at least one embodiment, if the charging interface of the mobile terminal is insertion-connected with the charging adapter, the second controller 2 may not only detect the insertion of the charging adapter but also detect whether the charging adapter is a standard charging adapter or a non-standard charging adapter by using USB2.0 protocol.

The second controller 2 sends the charging instruction to the first controller 1 if the second controller 2 detects the insertion of the charging adapter. Then, the switching assembly 3 may receive the switching instruction specifying the first switching terminal 302 and establish the electric connection between the first switching terminal 302 and the data interface terminal 301. In at least one embodiment, the switching instruction specifying the first switching terminal 302 may be sent directly by the second controller 2 to the switching assembly 3 if the second controller 2 detects the insertion of the charging adapter. In addition, in at least one embodiment, the switching instruction specifying the first switching terminal 302 may be sent by the first controller 1. In particular, the second controller 2 sends a quick-charging detection instruction to the first controller 1 if the second controller 2 detects the insertion of the charging adapter. In order to receive a quick-charging instruction when the quick-charging adapter sends this quick-charging instruction, the first controller 1 sends the switching instruction specifying the first switching terminal 302 to the switching assembly 3, such that the switching assembly 3 may establish the electric connection between the first switching terminal 302 and the data interface terminal 301.

Further, after the switching assembly 3 establishes the electric connection between the first switching terminal 302 and the data interface terminal 301, it is monitored from the first data terminal 102 in real time (i.e. the data interface terminal 301 of the switching assembly 3 is monitored); then, if the quick-charging adapter sends the quick-charging instruction to the data interface terminal 301 of the switching assembly 3, the first controller 1 may receive the quick-charging instruction from the first data terminal 102 timely. Then, after receiving the charging instruction sent by the second controller 2 and receiving the quick-charging instruction sent by the quick-charging adapter, the first controller 1 sends the connection instruction to the switch circuit 4 to connect the charging terminal 402 and the cell terminal 401 of the switch circuit 4, such that the quick-charging adapter may charge the cell via the switch circuit 4.

As another preferable embodiment of the present disclosure, if the second controller 2 of the mobile terminal detects the quick-charging adapter provided in embodiments of the present disclosure, the conventional charging circuit is used directly to perform a regular charging on the cell of the mobile terminal, and meanwhile the second controller 2 sends the charging instruction to the first controller 1; then, the first controller 1 sends the connection instruction to the switch circuit 4 if the quick-charging instruction sent by the quick-charging adapter is received after receiving the charging instruction, thereby connecting the cell terminal 401 and the charging terminal 402 of the switch circuit 4. The charging terminal 402 is externally coupled to the quick-charging adapter via the charging interface of the mobile terminal and the cell terminal 401 is coupled to the cell. In this way, the quick-charging adapter may charge the cell via the conventional charging circuit and also via the switch circuit 4, thereby effectively improving a charging speed of charging the cell.

In another embodiment of the present disclosure, the switching assembly 3 is implemented by adopting an analog switch. In at least one embodiment, the first data terminal 102 is coupled to the first switching terminal 302 of the switching assembly 3 via two differential data wires (a data wire positive D+, a data wire negative D−); at the same time, the switching assembly 3 is implemented by adopting a double-throw linkage switch.

In an embodiment of the present disclosure, the second controller 2 sends the charging instruction to the first controller 1 if the insertion of the charging adapter is detected, and meanwhile the switching assembly 3 receives the switching instruction specifying the first switching terminal 302. The switching instruction received by the switching assembly 3 may be triggered by two following preferable implementation.

In a preferable embodiment of the present disclosure, the second controller 2 is further configured to send the switching instruction specifying the first switching terminal 302 to the switching assembly 3 if the insertion of the quick-charging adapter is detected via the data interface terminal 301 of the switching assembly 3, such that the first controller 1 receives the quick-charging instruction from the first data terminal 102.

In another preferable embodiment of the present disclosure, the second controller 2 is further configured to send the quick-charging detection instruction to the first controller 1 if the insertion of the quick-charging adapter is detected via the data interface terminal 301 of the switching assembly 3;

the first controller 1 is further configured to send the switching instruction specifying the first switching terminal 302 to the switching assembly 3 if the quick-charging detection instruction is received, such that the first controller 1 receives the quick-charging instruction from the first data terminal 102.

In another embodiment of the present disclosure, in a process of charging the cell, or a pre-testing process required to charge the cell, the cell is checked, such that the cell may be charged safely.

Further and specifically, the first controller 1 has a detection terminal 106 and a fourth controlling terminal 105. The detection terminal 106 is externally coupled to a cell connector. The first controller 1 is configured to receive a positive electrode contact signal, a negative electrode contact signal and an electric quantity signal from the detection terminal 106, and to send the positive electrode contact signal, the negative electrode contact signal and the electric quantity signal from the first data transmission terminal 101, and is further configured to send a first disconnection instruction from the fourth controlling terminal 105 if a disconnection instruction is received from the first data transmission terminal 101.

The second controller 2 is further configured to receive the positive electrode contact signal, the negative electrode contact signal and the electric quantity signal sent by the first controller 1 from the second data transmission terminal 201 and is further configured to send the disconnection instruction from the second data transmission terminal 201 if it is determined that a positive electrode of the cell is not contacted well according to the positive electrode contact signal, that a negative electrode of the cell is not contacted well according to the negative electrode contact signal or that a voltage of the cell exceeds a voltage threshold according to the electric quantity signal.

The switch circuit 4 has a second controlled terminal 404. The second controlled terminal 404 is coupled to the fourth controlling terminal 105 of the first controller 1. The switch circuit 4 is configured to disconnect the electric connection between the charging terminal 402 and the cell terminal 401 if the first disconnection instruction is received from the second controlled terminal 404, such that the quick-charging adapter stops charging the cell via the switch circuit 4.

In this embodiment, the cell connector may generate detection signals such as the positive electrode contact signal, the negative electrode contact signal and the electric quantity signal in real time; at the same time, the first controller 1 receives the detection signals such as the positive electrode contact signal, the negative electrode contact signal and the electric quantity signal in real time and send the above received detection signals to the second controller 2.

Then, the second controller 2 determines whether a positive electrode charging contact of the charging circuit of the mobile terminal and the positive electrode of the cell are well in contact according to the received positive electrode contact signal, whether a negative electrode charging contact of the charging circuit of the mobile terminal and the negative electrode of the cell are well in contact according to the received negative electrode contact signal and whether the voltage of the cell exceeds the voltage threshold (this voltage threshold is set according to actual charging requirements, and normally is set to be a voltage value at which electric quantity in the cell is approximately full, for example, this voltage threshold is 4.35V) according to the electric quantity signal.

Further, if it is detected that the positive electrode charging contact and the positive electrode of the cell are not well in contact, that the negative electrode charging contact and the negative electrode of the cell well are not well in contact, or that the voltage of the cell exceeds the voltage threshold, the second controller 2 sends the disconnection instruction to the first controller 1 from the second data transmission terminal 201, so as to instruct the charging adapter to stop charging the cell according to the disconnection instruction.

Further, when receiving the disconnection instruction from the first data transmission terminal 101, the first controller 1 sends the first disconnection instruction to the switch circuit 4 from the fourth controlling terminal 105. When the switch circuit 4 receives the first disconnection instruction, the electric connection between the charging terminal 402 and the cell terminal 401 thereof is disconnected, and then a charging for the cell of the mobile terminal via the switch circuit 4 is stopped.

In another embodiment of the present disclosure, the second controller 2 is further configured to send a switching instruction specifying the second switching terminal 303 to the switching assembly 3 if the insertion of the quick-charging adapter is not detected at the second data terminal 202 via the data interface terminal 301 of the switching assembly 3.

Specifically, if the second switching terminal 303 is coupled with the data interface terminal 301 electrically in the switching assembly 3, i.e. the second data terminal 202 of the second controller 2 is coupled with the data interface terminal 301 of the switching assembly 3 electrically, the second controller 2 cannot detect the insertion of the quick-charging adapter and does nothing once the quick-charging adapter is disconnected from the charging interface of the mobile terminal. Or the second controller 2 sends the switching instruction specifying the second switching terminal 303 to the switching assembly 3, and the switching assembly 3 keeps the electric connection between the second switching terminal 303 and the data interface terminal 301. In this way, when the charging interface of the quick-charging adapter is insertion-connected with the charging interface of the mobile terminal well again, the second controller 2 detects the insertion of the charging adapter again, and then sends the charging instruction to the first controller 1 again; thus, the first controller 1 sends the connection instruction to the switch circuit 4 when the quick-charging instruction is received after receiving the charging instruction, such that the quick-charging adapter may charge the cell of the mobile terminal via the switch circuit 4 again (at the same time, the quick-charging adapter also continues to charge the cell of the mobile terminal via the conventional charging circuit).

In another embodiment of the present disclosure, the first controller 1 is further configured to send the switching instruction specifying the second switching terminal 303 to the switching assembly 3 if the insertion of the quick-charging adapter is not detected at the first data terminal 102 via the data interface terminal 301 of the switching assembly 3.

Specifically, if the first switching terminal 302 is coupled with the data interface terminal 301 electrically in the switching assembly 3, i.e. the first data terminal 102 of the first controller 1 is coupled with the data interface terminal 301 of the switching assembly 3 electrically, the first controller 1 cannot detect the insertion of the quick-charging adapter once the quick-charging adapter is disconnected from the charging interface of the mobile terminal, and then the first controller 1 sends the switching instruction specifying the second switching terminal 303 to the switching assembly 3, and the switching assembly 3 establishes the electric connection between the second switching terminal 303 and the data interface terminal 301. In this way, when the charging interface of the quick-charging adapter is insertion-connected with the charging interface of the mobile terminal well again, the second controller 2 detects the insertion of the charging adapter again, and then sends the charging instruction to the first controller 1 again; thus, the first controller 1 sends the connection instruction to the switch circuit 4 when the quick-charging instruction is received after receiving the charging instruction, such that the quick-charging adapter may charge the cell of the mobile terminal via the switch circuit 4 again (at the same time, the quick-charging adapter also continues to charge the cell of the mobile terminal via the conventional charging circuit).

Figure 2:
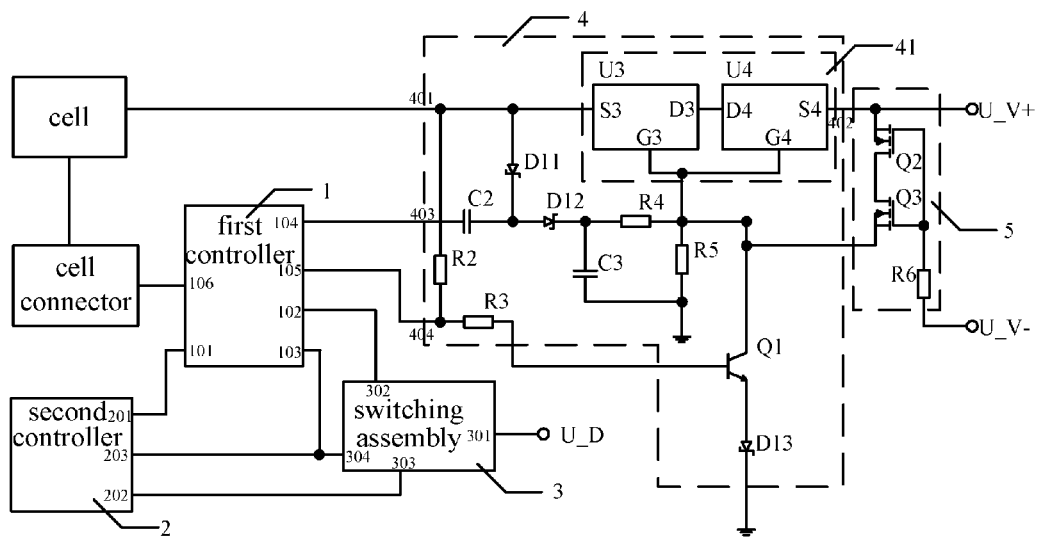
FIG. 2 is a specific circuit diagram showing a circuit for switching a charging mode according to an embodiment of the present disclosure.

FIG. 2 illustrates a specific circuit diagram showing a circuit for switching a charging mode according to an embodiment of the present disclosure. For illustration purposes, only the parts related to embodiments of the present disclosure are shown, which will be described in detail as follows.

In at least one embodiment, the switch circuit 4 includes: a second capacitor C2, a third capacitor C3, a second resistor R2, a third resistor R3, a fourth resistor R4, a fifth resistor R5, a first Schottky diode D11, a second Schottky diode D12, a third Schottky diode D13, a NPN triode Q1 and a switch component 41.

A first terminal of the second resistor R2, a second terminal of the switch component 41, a first terminal of the second capacitor C2 and a second terminal of the second resistor R2 are configured as the cell terminal 401, the charging terminal 402, the first controlled terminal 403 and the second controlled terminal 404 of the switch circuit 4 respectively. A first terminal and a second terminal of the third resistor R3 are coupled to the second terminal of the second resistor R2 and a base of the NPN triode Q1 respectively. An anode and a cathode of the third Schottky diode D13 are coupled to an emitter of the NPN triode Q1 and grounded respectively. An anode and a cathode of the first Schottky diode D11 are coupled to the first terminal of the second resistor R2 and a second terminal of the second capacitor C2 respectively. An anode and a cathode of the second Schottky diode D12 are coupled to the second terminal of the second capacitor C2 and a first terminal of the fourth resistor R4 respectively. A first terminal and a second terminal of the third capacitor C3 are coupled to the cathode of the second Schottky diode D12 and grounded respectively. A first terminal of the fifth resistor R5 is coupled to the second terminal of the third capacitor C3 and grounded, and a second terminal of the fifth resistor R5 is coupled to the second terminal of the fourth resistor R4. A collector of the NPN triode Q1 is coupled to a second terminal of the fourth resistor R4. The second terminal and a controlled terminal of the switch component 41 are coupled to the first terminal of the second resistor R2 and the second terminal of the fourth resistor R4 respectively.

In specific applications, when the connection instruction (the connection instruction of high potential) is received from the first controlled terminal 403, the controlled terminal of the switch component 41 also receives an electric signal of high potential. Then, the second terminal and the first terminal of the switch component 41 are coupled electrically so as to form an electric path from the charging terminal 402 to the cell terminal 401 through the switch component 41. Then, the power signal accessed from the first power wire of the charging interface of the mobile terminal may charge the cell of the mobile terminal via the switch circuit 4.

When the first disconnection instruction of high potential is received from the second controlled terminal 404, the NPN triode Q1 is turned on. Then the controlled terminal of the switch component 41 receives an electric signal of low potential, and the electric connection between the second terminal and the first terminal of the switch component 41 is disconnected, thereby disconnecting the electric path from the charging terminal 402 to the cell terminal 401 and stopping the charging for the cell of the mobile terminal via the switch circuit 4.

In at least one embodiment, the switch component 41 includes: a third switch chip U3 and a fourth switch chip U4. A source pin S3 of the third switch chip U3, a source pin S4 of the fourth switch chip U4 and a grid pin G4 of the fourth switch chip U4 are configured as the second terminal, the first terminal and the controlled terminal of the switch component 41 respectively, and a grid pin G3 and a drain pin D3 of the third switch chip U3 are coupled to the grid pin G4 and a drain pin D4 of the fourth switch chip U4 respectively.

In this embodiment, if the controlled terminal of the switch component 41 receives an electric signal of high potential, the grid pin G3 of the third switch chip U3 and the grid pin G4 of the fourth switch chip U4 also receive the electric signal of high potential. Then, the source pin S3 and drain pin D3 of the third switch chip U3 are turned on electrically, and the source pin S4 and drain pin D4 of the fourth switch chip U4 are turned on electrically. Then, the electric path is formed by the source pin S3 of the third switch chip U3 and the source pin S4 of the fourth switch chip U4, and the first terminal and the second terminal of the switch component 41 are coupled electrically.

Conversely, if the controlled terminal of the switch component 41 receives an electric signal of low potential, the grid pin G3 of the third switch chip U3 and the grid pin G4 of the fourth switch chip U4 also receive the electric signal of low potential. Then, the source pin S3 and drain pin D3 of the third switch chip U3 are turned off electrically, and the source pin S4 and drain pin D4 of the fourth switch chip U4 are turned off electrically. Then, the electric path cannot be formed by the source pin S3 of the third switch chip U3 and the source pin S4 of the fourth switch chip U4, and the first terminal and the second terminal of the switch component 41 cannot coupled electrically, such that the power signal accessed from the high potential charging input terminal cannot charge the cell of the mobile terminal via the switch circuit 4.

In at least one embodiment, an anti-reverse circuit 5 includes a sixth resistor R6, a first N-type MOS transistor Q2 and a second N-type MOS transistor Q3.

A source of the first N-type MOS transistor Q2 and a second terminal of the sixth resistor R6 are coupled to a power wire (i.e. the node U_V+) and a ground wire (i.e. the node U_V−) of the charging interface of the mobile terminal respectively. A source of the second N-type MOS transistor Q3 is coupled to the collector of the NPN triode Q1. A grid and a drain of the first N-type MOS transistor Q2 are coupled to a grid and a drain of the second N-type MOS transistor Q3 respectively. A first terminal of the sixth resistor R6 is coupled to the grid of the first N-type MOS transistor Q2.

Specifically, if a ground signal is accessed from the power wire of the charging interface of the mobile terminal and meanwhile a power signal is accessed from the ground wire of the charging interface of the mobile terminal, both the first N-type MOS transistor Q2 and the second N-type MOS transistor Q3 are turned on. Then the controlled terminal of the switch component 41 receives the electric signal of low potential, the first terminal and the second terminal of the switch component 41 cannot form the electric path and the charging loop with which the cell of the mobile terminal is charged by the quick-charging adapter via the switch circuit 4 is disconnected.

In another embodiment of the present disclosure, the charging interface of the mobile terminal has P first power wires, Q first ground wires and N first data wires, where P is greater than or equal to 2, Q is greater than or equal to 2, and N is greater than or equal to 1.

Further, if the MICRO USB interface (only having one power wire and one ground wire) of the conventional charging adapter is inserted, the first controller 1 cannot receive the quick-charging instruction after receiving the charging instruction. Thus, the state that the switch circuit 4 disconnects the cell terminal 401 and the charging terminal 402 is kept, and the charging adapter only charges the cell via the conventional charging circuit of the mobile terminal. In at least one embodiment, a corresponding charging may be performed according the charging adapter recognized (the charging adapter is recognized as the standard charging adapter or the non-standard charging adapter) by the second controller 2 using USB2.0 protocol.

In at least one embodiment, each of the first power wire and/or the first ground wire is made of phosphor bronze C7025 with conductivity reaching 50%. Therefore, compared to the MICRO USB interface (in which each of the power wire and the ground wire is made of metal copper foil with conductivity less than 20%), the charging interface of the mobile terminal provided in the embodiments of the present disclosure may endure higher charging current.

In another embodiment of the present disclosure, the charging interface of the quick-charging adapter has P second power wires, Q second ground wires and N second data wires, where P is greater than or equal to 2, Q is greater than or equal to 2 and N is greater than or equal to 1.

Further, when the charging interface of the quick-charging adapter is insertion-connected with the charging interface of the mobile terminal, the P first power wires in the charging interface of the mobile terminal are insertion-connected with the P second power wires in the charging interface of the quick-charging adapter respectively, the Q first ground wires in the charging interface of the mobile terminal are insertion-connected with the Q second ground wires in the charging interface of the quick-charging adapter respectively, and the N first data wires in the charging interface of the mobile terminal are insertion-connected with the N second data wires in the charging interface of the quick-charging adapter respectively. Further, when the cell is charged, at least two charging loops (the number of the charging loops is a minimum of P and Q) are provided. The charging current supported by each charging loop at least is the charging current supported by the conventional charging loop (the charging loop provided by the conventional MCIRO USB interface). Therefore, compared to the conventional MCIRO USB interface providing only one charging loop, the higher charging current (3 A or above) may be supported after the charging interface of the mobile terminal is insertion-connected with the charging interface of the quick-charging adapter. In this way, the quick-charging adapter may perform a charging with higher charging current via the switch circuit 4 and the conventional charging circuit.

In at least one embodiment, each of the second power wire and/or the second ground wire is made of phosphor bronze C7025 with conductivity reaching 50%. Therefore, compared to the MICRO USB interface (in which each of the power wire and the ground wire is made of metal copper foil with conductivity less than 20%), the charging interface of the quick-charging adapter provided in the embodiments of the present disclosure may endure higher charging current.

Figure 3:
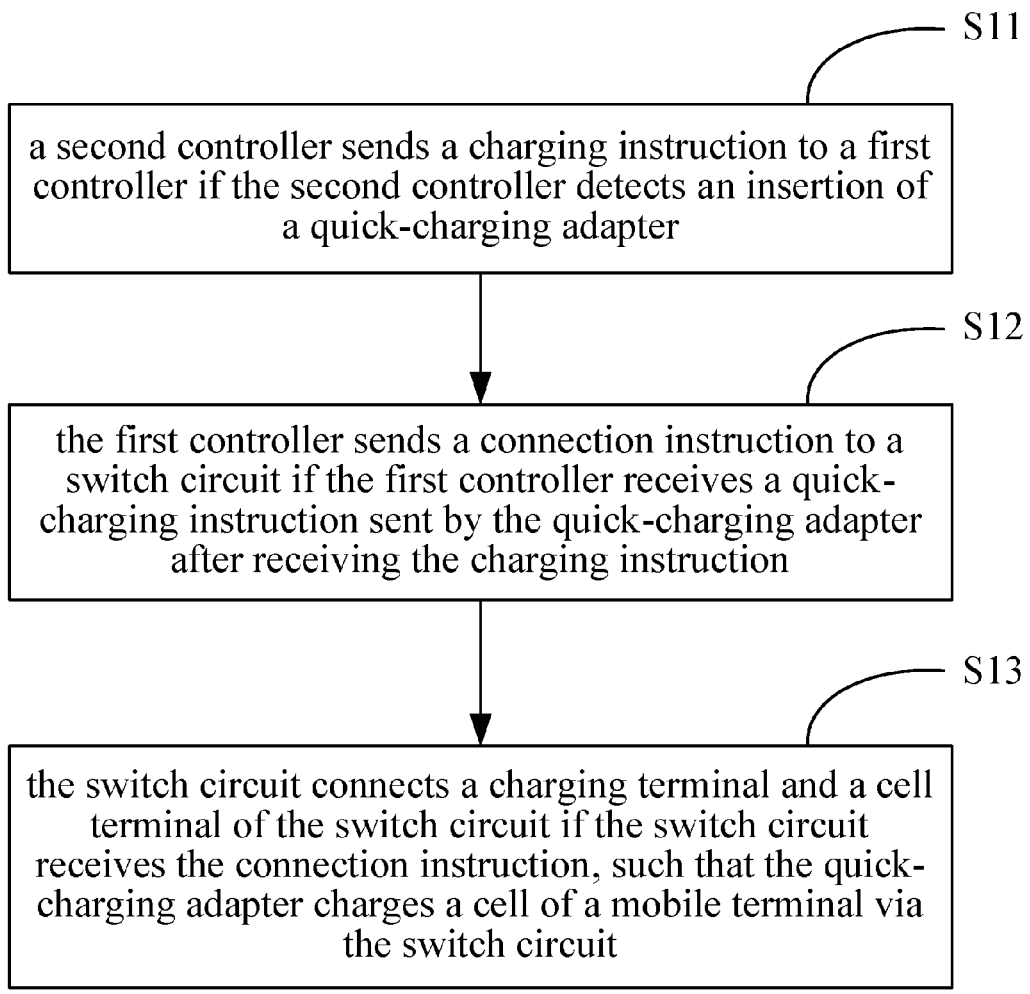
FIG. 3 is a first flow chart showing a method for switching a charging mode according to an embodiment of the present disclosure.

FIG. 3 illustrates a first flow chart showing a method for switching a charging mode according to an embodiment of the present disclosure. For illustration purposes, only the parts related to embodiments of the present disclosure are shown, which will be described in detail as follows.

It should be noted that, the method for switching a charging mode according to an embodiment of the present disclosure and the circuit for switching a charging mode according to an embodiment of the present disclosure are suitable with each other.

The method for switching a charging mode provided in embodiments of the present disclosure includes the following acts.

In block S11, a second controller sends a charging instruction to a first controller if the second controller detects an insertion of a quick-charging adapter.

In block S12, the first controller sends a connection instruction to a switch circuit if the first controller receives a quick-charging instruction sent by the quick-charging adapter after receiving the charging instruction.

In block S13, the switch circuit connects a charging terminal and a cell terminal of the switch circuit if the switch circuit receives the connection instruction, such that the quick-charging adapter charges a cell of a mobile terminal via the switch circuit.

In this particular embodiment, the second controller of the mobile terminal detects whether there is the insertion of the charging adapter (including the quick-charging adapter), and then sends the charging instruction to the first controller if the insertion of the charging adapter is detected.

Further, the first controller is in a monitor state, and sends the connection instruction to the switch circuit once it receives the quick-charging instruction that means that the inserted charging adapter is a quick-charging adapter. Then, the switch circuit connects the charging terminal (coupled to the charging interface of the mobile terminal) and the cell terminal (coupled to the cell of the mobile terminal), and then establishes the charging path between the quick-charging adapter and the cell of the mobile terminal, such that the quick-charging adapter may charge the cell of the mobile terminal via the switch circuit.

In a particular embodiment of the present disclosure, when the second controller of the mobile terminal detects whether a charging adapter (including the quick-charging adapter) is inserted, the charging adapter may charge the cell of the mobile terminal directly via the conventional charging circuit. Meanwhile, the first controller enters the monitor state and sends the connection instruction to the switch circuit once it receives the quick-charging instruction. Then, the switch circuit establishes the charging path between the quick-charging adapter and the cell of the mobile terminal, such that the quick-charging adapter also charges the cell of the mobile terminal via the switch circuit. Therefore, the mobile terminal can be compatible with the conventional charging adapter and enters the regular charging mode (only using the conventional charging circuit for charging). In addition, the mobile terminal may also support the charging of the quick-charging adapter and enters the quick-charging charge mode (the cell is charged simultaneously through the conventional charging circuit and the switch circuit).

Figure 4:
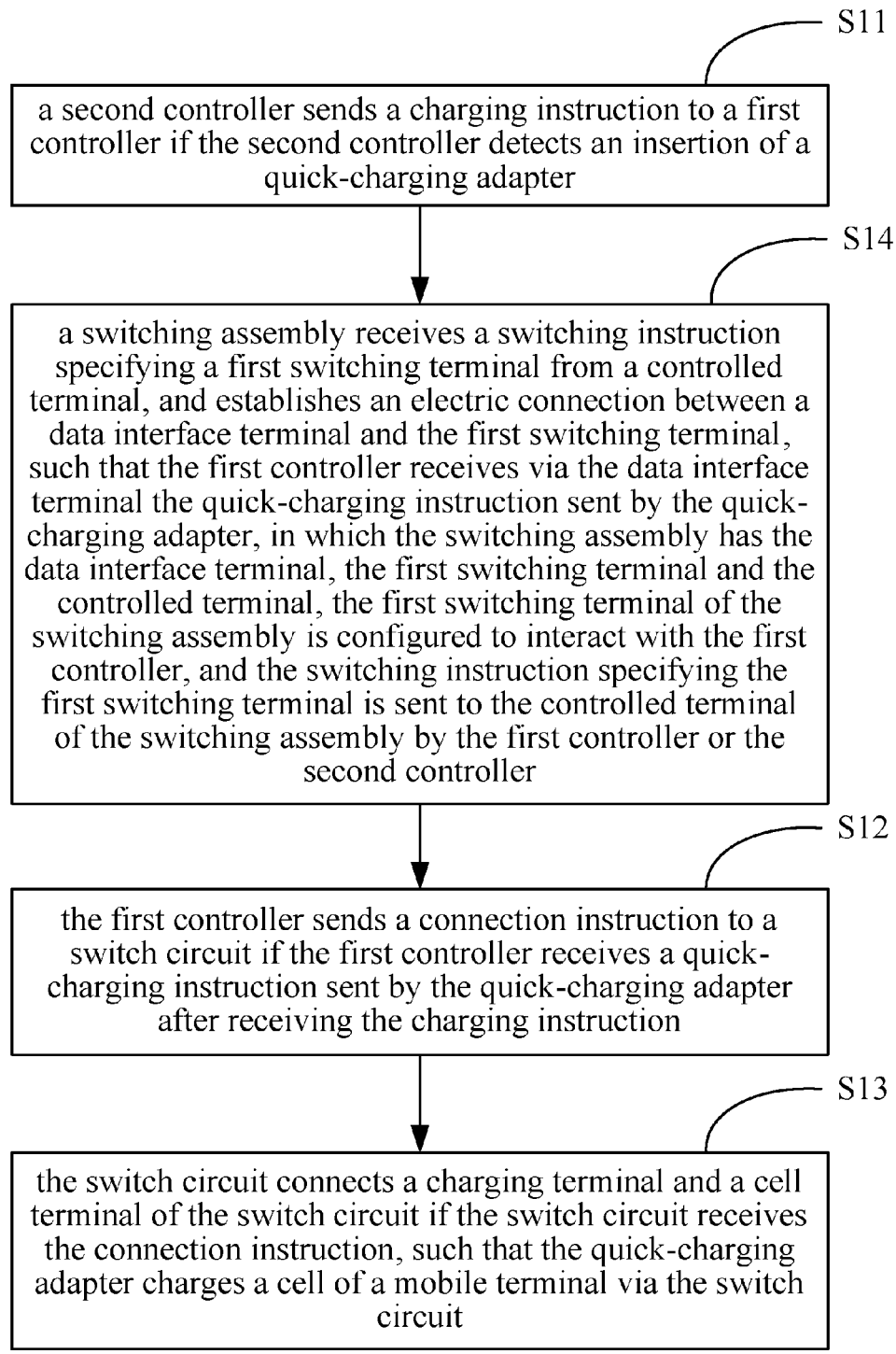
FIG. 4 is a second flow chart showing a method for switching a charging mode according to an embodiment of the present disclosure.

FIG. 4 illustrates a second flow chart showing a method for switching a charging mode according to an embodiment of the present disclosure. For illustration purposes, only the parts related to embodiments of the present disclosure are shown, which will be described in detail as follows.

In another embodiment of the present disclosure, after the second controller sends the charging instruction to the first controller if the second controller detects the insertion of the quick-charging adapter, the method for switching a charging mode further includes the following act.

S14, a switching assembly receives a switching instruction specifying a first switching terminal from a controlled terminal, and establishes an electric connection between a data interface terminal and the first switching terminal, such that the first controller receives via the data interface terminal the quick-charging instruction sent by the quick-charging adapter, in which the switching assembly has the data interface terminal, the first switching terminal and the controlled terminal, the first switching terminal of the switching assembly is configured to interact with the first controller, and the switching instruction specifying the first switching terminal is sent to the controlled terminal of the switching assembly by the first controller or the second controller.

In this particular embodiment, the second controller of the mobile terminal detects whether a charging adapter (including the quick-charging adapter) is inserted, and then sends the charging instruction to the first controller if it detects the insertion of the charging adapter. Then, the switching assembly receives the switching instruction specifying the first switching terminal and establishes the electric connection between the data interface terminal and the first switching terminal. Specifically, after detecting the insertion of the charging adapter, the switching instruction is sent by the first controller or the second controller, as detailed below.

In a first way, the switching instruction specifying the first switching terminal may be sent directly by the second controller to the switching assembly when the second controller detects the insertion of the charging adapter.

In a second way, the switching instruction specifying the first switching terminal is sent by the first controller. Specifically, the second controller may send the quick-charging detection instruction to the first controller when detecting the insertion of the charging adapter. In order to receive the quick-charging instruction when the quick-charging adapter sends the quick-charging instruction, the first controller sends the switching instruction specifying the first switching terminal to the switching assembly.

In this way, the switching assembly establishes the electric connection between the first switching terminal and the data interface terminal and enters the monitor state. The first controller may receive the quick-charging instruction sent by the quick-charging adapter via the data interface terminal (the first switching terminal) once the quick-charging adapter sends the quick-charging instruction. Then, the first controller sends the connection instruction to the switch circuit, and the switch circuit connects the charging terminal (coupled to the charging interface of the mobile terminal) and the cell terminal (coupled to the cell of the mobile terminal), and then establishes the charging path between the quick-charging adapter and the cell of the mobile terminal, such that the quick-charging adapter may charge the cell of the mobile terminal via the switch circuit.

The foregoing description is further explanation for the present disclosure with reference to preferred embodiments, and cannot be used to limit the present disclosure. For those ordinary skilled in the art, equivalents, alternatives and obvious variants may be made without departing from the spirit of the present disclosure, may have same functions or usages, and may belong to the protection scope determined by the claims submitted in the present disclosure.

What is claimed is:

1. A circuit for switching a charging mode, coupled to a cell, being externally coupled to a quick-charging adapter, and the circuit for switching a charging mode comprising:
   a switch circuit, having a cell terminal, a charging terminal and a first controlled terminal, wherein the cell terminal is coupled to the cell, and the switch circuit is configured to connect the charging terminal and the cell terminal if a connection instruction is received from the first controlled terminal, such that the quick-charging adapter charges the cell via the switch circuit;
   a switching assembly, having a data interface terminal, a first switching terminal, a second switching terminal and a controlled terminal, and configured to receive a switching instruction from the controlled terminal, wherein an electric connection between the data interface terminal and the first switching terminal is established if the switching instruction specifies the first switching terminal, and an electric connection between the data interface terminal and the second switching terminal is established if the switching instruction specifies the second switching terminal;
   a first controller, having a first data transmission terminal, a first data terminal, a first controlling terminal and a third controlling terminal, wherein the first data terminal is coupled to the first switching terminal of the switching assembly, the first controlling terminal is coupled to the controlled terminal of the switching assembly, the third controlling terminal is coupled to the first controlled terminal of the switch circuit, and the first controller is configured to receive a charging instruction and further configured to receive a quick-charging instruction at the first data terminal via the data interface terminal of the switching assembly, and further configured to send the connection instruction from the third controlling terminal if the charging instruction is received and the quick-charging instruction is received; and
   a second controller, having a second data transmission terminal, a second data terminal and a second controlling terminal, wherein the second data terminal is coupled to the second switching terminal of the switching assembly, the second controlling terminal is coupled to the controlled terminal of the switching assembly, the second data transmission terminal is coupled to the first data transmission terminal of the first controller, and the second controller is configured to send the charging instruction to the first controller if an insertion of the quick-charging adapter is detected at the second data terminal via the data interface terminal of the switching assembly.

2. The circuit for switching a charging mode according to claim 1, wherein, the second controller is further configured to:
   send a switching instruction specifying the first switching terminal to the switching assembly if the insertion of the quick-charging adapter is detected via the data interface terminal of the switching assembly, such that the first controller receives the quick-charging instruction from the first data terminal.

3. The circuit for switching a charging mode according to claim 1, wherein,
   the second controller is further configured to:
      send a quick-charging detection instruction to the first controller if the insertion of the quick-charging adapter is detected via the data interface terminal of the switching assembly;
   the first controller is further configured to:
      send a switching instruction specifying the first switching terminal to the switching assembly if the quick-charging detection instruction is received, such that the first controller receives the quick-charging instruction from the first data terminal.

4. The circuit for switching a charging mode according to claim 1, wherein,
   the first controller, further having a detection terminal and a fourth controlling terminal and the detection terminal being externally coupled to a cell connector, is configured to receive a positive electrode contact signal, a negative electrode contact signal and an electric quantity signal from the detection terminal, and to send the positive electrode contact signal, the negative electrode contact signal and the electric quantity signal from the first data transmission terminal, and is further configured to send a first disconnection instruction from the fourth controlling terminal if a disconnection instruction is received from the first data transmission terminal;

the second controller, is further configured to receive the positive electrode contact signal, the negative electrode contact signal and the electric quantity signal sent by the first controller from the second data transmission terminal and is further configured to send the disconnection instruction from the second data transmission terminal if it is determined that a positive electrode of the cell is not contacted well according to the positive electrode contact signal, that a negative electrode of the cell is not contacted well according to the negative electrode contact signal, or that a voltage of the cell exceeds a voltage threshold according to the electric quantity signal;

the switch circuit, having a second controlled terminal coupled to the fourth controlling terminal of the first controller, is further configured to disconnect an electric connection between the charging terminal and the cell terminal if the first disconnection instruction is received from the second controlled terminal, such that the quick-charging adapter stops charging the cell via the switch circuit.

5. The circuit for switching a charging mode according to claim 1, wherein, the second controller, is further configured to send a switching instruction specifying the second switching terminal to the switching assembly if the insertion of the quick-charging adapter is not detected at the second data terminal via the data interface terminal of the switching assembly.

6. The circuit for switching a charging mode according to claim 1, wherein, the first controller, is further configured to send a switching instruction specifying the second switching terminal to the switching assembly if the insertion of the quick-charging adapter is not detected at the first data terminal via the data interface terminal of the switching assembly.

7. The circuit for switching a charging mode according to claim 4, wherein, the switch circuit comprises: a second capacitor, a third capacitor, a second resistor, a third resistor, a fourth resistor, a fifth resistor, a first Schottky diode, a second Schottky diode, a third Schottky diode, a NPN triode and a switch component;

a first terminal of the second resistor, a second terminal of the switch component, a first terminal of the second capacitor and a second terminal of the second resistor are configured as the cell terminal, the charging terminal, the first controlled terminal and the second controlled terminal of the switch circuit respectively, a first terminal and a second terminal of the third resistor are coupled to the second terminal of the second resistor and a base of the NPN triode respectively, an anode and a cathode of the third Schottky diode are coupled to an emitter of the NPN triode and grounded respectively, an anode and a cathode of the first Schottky diode are coupled to the first terminal of the second resistor and a second terminal of the second capacitor respectively, an anode and a cathode of the second Schottky diode are coupled to the second terminal of the second capacitor and a first terminal of the fourth resistor respectively, a first terminal and a second terminal of the third capacitor are coupled to the cathode of the second Schottky diode and grounded respectively, a first terminal of the fifth resistor is coupled to the second terminal of the third capacitor and grounded, a second terminal of the fifth resistor is coupled to the second terminal of the fourth resistor, a collector of the NPN triode is coupled to a second terminal of the fourth resistor, and the second terminal and a controlled terminal of the switch component are coupled to the first terminal of the second resistor and the second terminal of the fourth resistor respectively.

8. The circuit for switching a charging mode according to claim 7, wherein, the switch component comprises a third switch chip and a fourth switch chip;

a source pin of the third switch chip, a source pin of the fourth switch chip and a grid pin of the fourth switch chip are configured as the second terminal, the first terminal and the controlled terminal of the switch component respectively, and a grid pin and a drain pin of the third switch chip are coupled to the grid pin and a drain pin of the fourth switch chip respectively.

9. A method for switching a charging mode, wherein, the method for switching a charging mode comprises:

sending, by a second controller, a charging instruction to a first controller if the second controller detects an insertion of a quick-charging adapter;

sending, by the first controller, a connection instruction to a switch circuit if the first controller receives a quick-charging instruction sent by the quick-charging adapter after receiving the charging instruction; and connecting, by the switch circuit, a charging terminal and a cell terminal of the switch circuit if the switch circuit receives the connection instruction, such that the quick-charging adapter charges a cell of a mobile terminal via the switch circuit;

wherein, after sending, by the second controller, the charging instruction to the first controller if the second controller detects the insertion of the quick-charging adapter, the method for switching a charging mode further comprises:

receiving, by a switching assembly, a switching instruction specifying a first switching terminal from a controlled terminal, and establishing, by the switching assembly, an electric connection between a data interface terminal and the first switching terminal, such that the first controller receives via the data interface terminal the quick-charging instruction sent by the quick-charging adapter, wherein the switching assembly has the data interface terminal, the first switching terminal and the controlled terminal, the first switching terminal of the switching assembly is configured to interact with the first controller, and the switching instruction specifying the first switching terminal is sent to the controlled terminal of the switching assembly by the first controller or the second controller.

10. The circuit for switching a charging mode according to claim 1, wherein, the charging terminal of the switch circuit is coupled to a first power wire of a charging interface of a mobile terminal and the data interface terminal of the switching assembly is coupled to a first data wire of the charging interface of the mobile terminal.

11. The circuit for switching a charging mode according to claim 7, being characterized at, further comprising an anti-reverse circuit; wherein the anti-reverse circuit comprises: a sixth resistor, a first N-type MOS transistor and a second N-type MOS transistor; wherein a source of the first N-type MOS transistor and a second terminal of the sixth resistor are coupled to a power wire and a ground wire of a charging interface of a mobile terminal respectively; a source of the second N-type MOS transistor is coupled to the collector of the NPN triode; a grid and a drain of the first N-type MOS transistor are coupled to a grid and a drain of the second N-type MOS transistor respectively; and a first terminal of the sixth resistor is coupled to the grid of the first N-type MOS transistor.

12. The circuit for switching a charging mode according to claim 1, wherein, the second controller is further configured to use a conventional charging circuit to perform a regular charging on the cell if the quick-charging adapter is detected.

13. The circuit for switching a charging mode according to claim 1, wherein, the second controller is further configured to recognize that a data communication is required to be performed with another terminal if it is detected that a USB interface of the another terminal is inserted.

14. The circuit for switching a charging mode according to claim 1, wherein, the first data terminal is coupled to the first switching terminal of the switching assembly via two differential data wires and the switching assembly is implemented by adopting a double-throw linkage switch.

15. The circuit for switching a charging mode according to claim 4, wherein, the voltage threshold is set to be a voltage value at which electric quantity in the cell is approximately full.

16. The circuit for switching a charging mode according to claim 10, wherein, the charging interface of the mobile terminal has P first power wires, Q first ground wires and N first data wires, where P is greater than or equal to 2, Q is greater than or equal to 2, and N is greater than or equal to 1.

17. The circuit for switching a charging mode according to claim 16, wherein, each of the first power wire and the first ground wire is made of phosphor bronze C7025 with conductivity reaching 50%.

18. The circuit for switching a charging mode according to claim 1, wherein, a charging interface of the quick-charging adapter has P second power wires, Q second ground wires and N second data wires, where P is greater than or equal to 2, Q is greater than or equal to 2 and N is greater than or equal to 1.

19. The circuit for switching a charging mode according to claim 18, wherein, each of the second power wire and the second ground wire is made of phosphor bronze C7025 with conductivity reaching 50%.

* * * * *